United States Patent [19]

Fenimore

[11] 4,389,633

[45] Jun. 21, 1983

[54] CODED APERTURE IMAGING WITH SELF-SUPPORTING UNIFORMLY REDUNDANT ARRAYS

[75] Inventor: Edward E. Fenimore, Los Alamos, N. Mex.

[73] Assignee: The United States of America as represented by the United States Department of Energy, Washington, D.C.

[21] Appl. No.: 191,192

[22] Filed: Sep. 26, 1980

[51] Int. Cl.$^3$ .............................................. G01T 1/00
[52] U.S. Cl. ................................. 382/26; 250/363 S; 250/505.1; 350/162.16; 364/728
[58] Field of Search .............................. 250/272–274, 250/320, 363 R, 363 S, 390–392, 445 R, 445 T; 350/162 SF, 162 ZP, 169, 319; 364/414, 515, 728, 819; 340/146.3 F, 146.3 Q, 146.3 MA, 146.3 P

[56] References Cited

U.S. PATENT DOCUMENTS

| | | | |
|---|---|---|---|
| 3,748,470 | 7/1973 | Barrett | 250/363 S |
| 3,831,031 | 8/1974 | Barrett et al. | 350/162 ZP |
| 3,839,108 | 10/1974 | Leinkram | 350/162 ZP |
| 3,860,821 | 1/1975 | Barrett | 250/363 S |
| 4,017,730 | 4/1977 | Barrett | 250/363 S |
| 4,165,462 | 8/1979 | Macovski et al. | 250/363 S |
| 4,209,780 | 6/1980 | Fenimore et al. | 340/146.3 F |
| 4,223,388 | 9/1980 | Nishikawa et al. | 250/363 S |
| 4,228,420 | 10/1980 | Fenimore et al. | 340/146.3 F |

OTHER PUBLICATIONS

Brown, C. M., Ph.D. Thesis, "Multiplex Imaging in Random Arrays", Chapter 3, pp. 40–77, University of Chicago, 1972.
Brown, C. M., "Multiplex Imaging with Multiple-Pin Hole Cameras", *Journal of Applied Physics*, vol. 45, No. 4, Apr. 1974, pp. 1806–1811.
*Bulletin of the American Physical Society*, vol. 23, No. 5, May/Jun. 1978, p. 881, Paragraph 8r8.
Fenimore et al., "Uniformly Redundant Array Imaging of Laser Driven Compressions", *Applied Optics*, vol. 18, No. 7, Apr. 1, 1979, pp. 945–947.
Fenimore et al., "Comparison of Fresnel Zone Plates and Uniformly Redundant Arrays", *Proc. of the Society of Photo-Optical Inst. Eng.*, vol. 149, Aug. 1978, pp. 232–236.
Fenimore et al., "Coded Aperture Imaging with Uniformly Redundant Arrays", *Applied Optics*, vol. 17, No. 3, Feb. 1, 1978, pp. 337–347.

*Primary Examiner*—Leo H. Boudreau
*Attorney, Agent, or Firm*—William W. Cochran, II; Paul D. Gaetjens; Richard G. Besha

[57] ABSTRACT

A self-supporting uniformly redundant array pattern for coded aperture imaging. The present invention utilizes holes which are an integer times smaller in each direction than holes in conventional URA patterns. A balance correlation function is generated where holes are represented by 1's, nonholes are represented by −1's, and supporting area is represented by 0's. The self-supporting array can be used for low energy applications where substrates would greatly reduce throughput. The balance correlation response function for the self-supporting array pattern provides an accurate representation of the source of nonfocusable radiation.

2 Claims, 14 Drawing Figures

LAG = 0    19 BALANCE CORRELATION FUNCTION (G)
           18 DETECTOR RESPONSE FUNCTION (P)    Σ = 0

LAG = 1    19 (G)
           18 (P)    Σ = 0

LAG = 2    19 (G)
           18 (P)    Σ = 8I

LAG = 3    19 (G)
           18 (P)    Σ = 0

CODED APERTURE IMAGING WITH SELF-SUPPORTING UNIFORMLY REDUNDANT ARRAYS

BACKGROUND OF THE INVENTION

The present invention pertains generally to nonfocusable optics (i.e., nonrefractive and nonreflective) and more particularly to coded aperture imaging. Other coded aperture imaging devices are disclosed in U.S. Pat. No. 4,209,780, entitled "Coded Aperture Imaging With Uniformly Redundant Arrays," by Edward E. Fenimore et al., issued June 24, 1980. This invention is a result of a contract with the Department of Energy (Contract W-7405-ENG-36).

Uniformly redundant arrays used for coded aperture imaging were first disclosed by Edward E. Fenimore et al. in the above-referenced U.S. patent, Applied Optics, 17, p. 337, Feb. 1, 1980, Applied Optics, 17, p. 3562, Nov. 16, 1978, Applied Optics, 18, p. 945, Apr. 1, 1979, and in Los Alamos Scientific Laboratory Mini-Review, LASL-78-102, January 1979. These references clearly point out the superior advantages of the use of uniformly redundant arrays in coded aperture imaging. For example, uniformly redundant arrays can be used to image X-ray radiation with very low noise characteristics. X-rays have many uses, from every day medical diagnostics, to probing the mysterious cosmic black holes. In many experiments, X-rays provide new and often unique information. The ability of X-rays to characterize the temperature and chemical make-up of material has been exploited in such fields as fusion energy and solar physics to gain insight into the physical processes that will some day help provide our energy needs.

A major difficulty in using information carried by X-rays is the difficulty in imaging X-ray information. In contrast to ordinary light, X-rays cannot be reflected readily by mirrors (nonreflective) or bent by lenses (non-refractive). Because ordinary cameras or telescopes are ineffective in forming an X-ray image, it is difficult to determine the location of the X-ray emitting source or structure within the source.

The single pinhole camera has been successfully used to image X-ray information. The single pinhole camera consists of a small hole in an otherwise opaque material, with a piece of film mounted at a predetermined distance behind the pinhole. An image is formed because the small hole restricts the viewing angle from any particular point on the film to only one small part of the emitting source. However, to provide resolution with a single pinhole camera the hole must be made as small as possible. If the hole is large, the X-ray intensity from the large area of the source will be averaged together, making it impossible to distinguish (resolve) smaller features. On the other hand, a small hole often has insufficient area to collect enough X-rays to produce an interpretable picture. In other words, the image produced by the pinhole camera has insufficient intensity. The conflict between the need for small hole to obtain resolution and the need for a large hole to obtain sufficient intensity often limits the usefulness of the X-ray pictures obtainable from a single pinhole camera.

Coded aperture imaging using uniformly redundant arrays, as set forth in the above-disclosed references, overcomes the conflicting requirements for imaging with a single pinhole camera. Images produced in this manner have flat side lobes resulting in the elimination of ghosts and extraneous noise common in conventional coded aperture imaging systems.

X-rays in the 1–10 keV energy range are of particular interest in many fields such as laser fusion and X-ray astronomy. Use of uniformly redundant array patterns for imaging in the 1–10 keV energy range is of great interest in many technical arts. However, uniformly redundant arrays, such as set forth in the above-disclosed references, are not a self supporting structure. Consequently, a supporting substrate must be used to support the uniformly redundant array apertures disclosed above. Unfortunately, however, throughput is greatly reduced by the use of substrates in low-energy applications such as 1–10 keV X-rays. Reduction of throughput conflicts directly with the intended purpose for using the uniformly redundant array coded aperture imaging system.

SUMMARY OF THE INVENTION

It is therefore an object of the present invention to provide a self-supporting uniformly redundant array aperture imaging device for imaging nonfocusable radiation.

It is also an object of the present invention to provide a self-supporting uniformly redundant array aperture imaging device for imaging a source of low energy non-focusable radiation.

Another object of the present invention is to provide a self-supporting uniformly redundant array aperture imaging device for imaging a source of low-energy nonfocusable radiation without artifacts.

Another object of the present invention is to provide a self-supporting uniformly redundant array aperture imaging device for imaging a source of nonfocusable radiation with high throughput.

Additional objects, advantages, and novel features of the invention are set forth in part in the description which follows and will become apparent in part to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the present invention may comprise a self-supporting uniformly redundant array aperture imaging device for imaging a source of nonfocusable radiation comprising a self-supporting uniformly redundant array aperture having holes which are an integer function smaller in each direction than holes of conventional uniformly redundant arrays, said holes of said self-supporting uniformly redundant array formed at corresponding positions in hole locations of said uniformly redundant array; means for detecting said nonfocusable radiation imaged by said uniformly redundant array; means for balance correlating information from said means for detecting to generate a decoded image of said source of said nonfocusable radiation, said means for balance correlating information from said means for detecting comprising a balance correlation function wherein holes are represented by 1, nonholes are represented by −1, and supporting area is represented by 0.

The present invention may also comprise, in accordance with its objects and purposes, a self-supporting uniformly redundant array aperture imaging device for imaging low energy nonfocusable radiation comprising: a self-supporting uniformly redundant array aperture aligned to aperture-image said nonfocusable radiation, said self-supporting uniformly redundant array comprising an aperture having holes of size c/n placed at (u, v) such that $u=c \cdot i$, $v=c \cdot j$, where $A(\text{mod}_r i, \text{mod}_s j)=1$, $0 \leq i \leq 2r$, and $0 \leq j \leq 2s$, n is an integer, and c is the spacing between possible hole locations; means for detecting said nonfocusable radiation imaged by said uniformly redundant array; and, means for balance correlating information from said means for detecting to generate a decoded image of said source of nonfocusable radiation, said means for balance correlating information from said means for detecting comprising a function G(I, J) wherein:

$$G(I,J) = 1 \text{ if } \text{mod}_n(I) = 0$$
$$\text{and } \text{mod}_n(J) = 0$$
$$\text{and } A[\text{mod}_r(I/n), \text{mod}_s(J/n)] = 1$$

$$G(I,J) = -1 \text{ if } \text{mod}_n(I) = 0$$
$$\text{and } \text{mod}_n(J) = 0$$
$$\text{and } A[\text{mod}_r(I/n), \text{mod}_s(J/n)] = 0$$

$$G(I,J) = 0 \text{ if } \text{mod}_n(I) \neq 0$$
$$\text{or } \text{mod}_n(J) \neq 0$$

$$0 \leq I \leq 2\ nr;\ 0 \leq J \leq 2\ ns$$

The present invention is capable of imaging nonfocusable radiation using a self-supporting uniformly redundant array aperture with high throughput. Supporting substrates are eliminated so that the advantages of the uniformly redundant array aperture can be utilized for low energy applications.

DETAILED DESCRIPTION OF THE PREFERRED EMBODIMENT OF THE INVENTION

Figure 1:
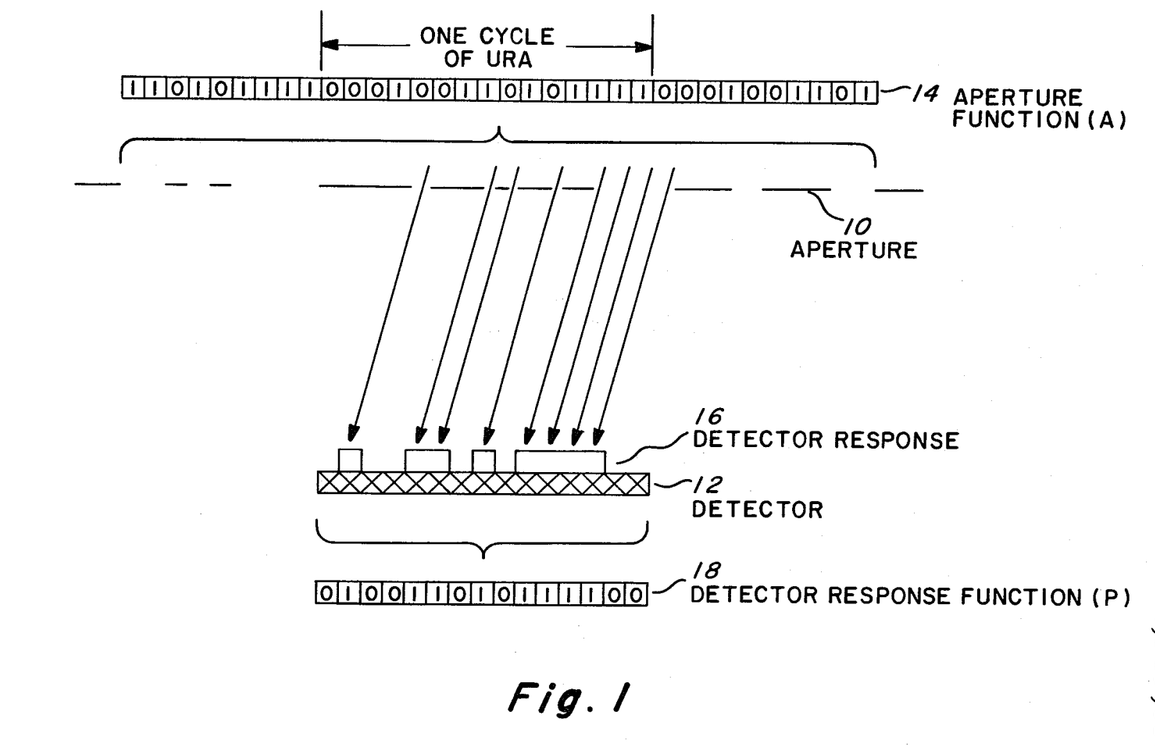
FIG. 1 is a schematic illustration of a one-dimensional coded aperture imaging system using a uniformly redundant array.

FIG. 1 discloses a schematic representation of a one-dimensional coded aperture imaging system utilizing a uniformly redundant array. Aperture 10 images an off axis point source (i.e., offset by the angle subtended by two spaces) at infinity onto a detector 12. Digital representation of the aperture function (A) is shown at 14. The function (A) is defined in U.S. Pat. No. 4,209,780 issued June 24, 1980 by Edward E. Fenimore et al. Detector 12 records the detector response 16 illustrated in FIG. 1. Digital representation of the detector response function (P) is shown at 18.

Figure 2:
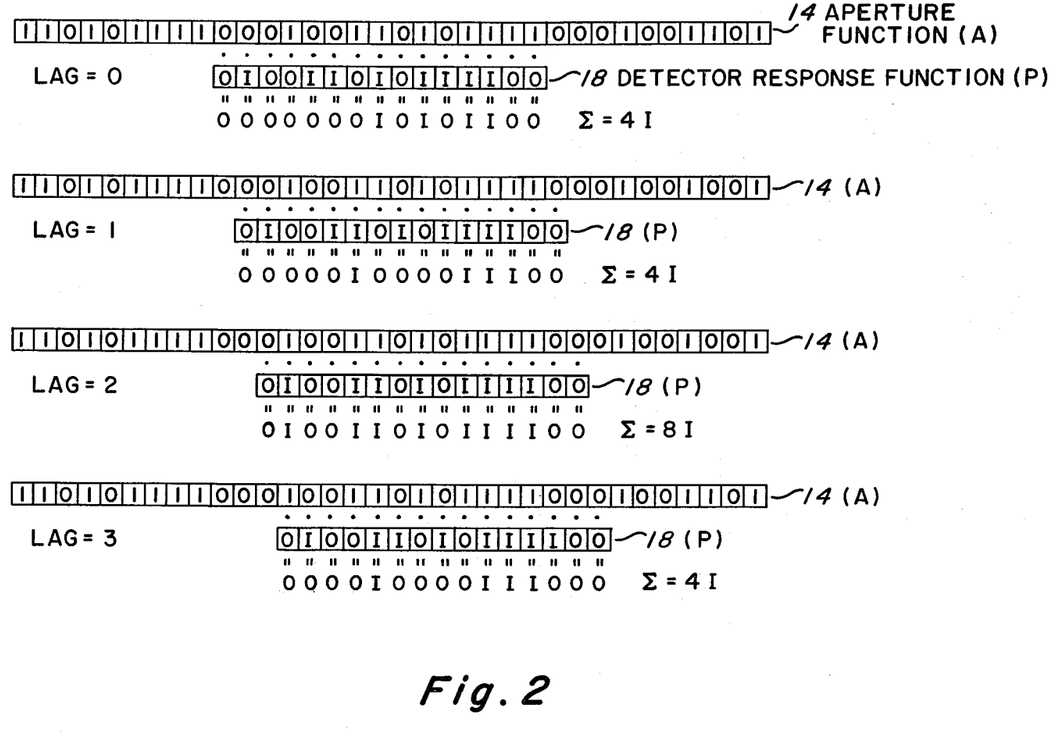
FIG. 2 is a schematic illustration of the manner in which the autocorrelation response function is generated for the device of FIG. 1.

FIG. 2 illustrates the manner in which the aperture function (A) can be autocorrelated with the detector response function (P). The detector response function (P) is aligned with the aperture response function for various lag positions. The 1's and 0's of the detector response function (P) are multiplied by the 0's or 1's of the aperture function (A) and the results are summed for each lag position.

Figure 3:
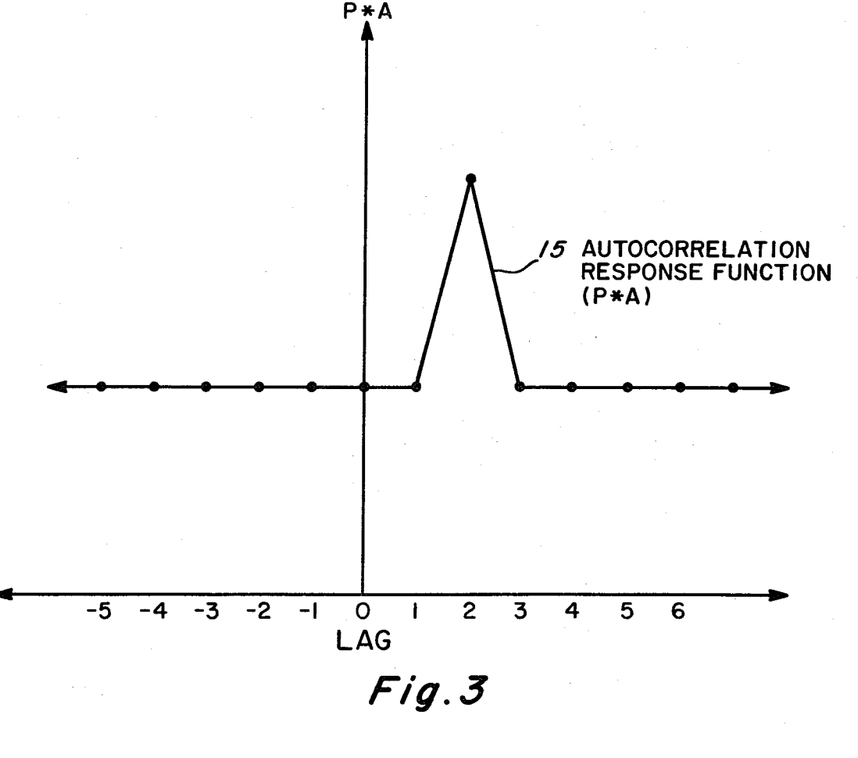
FIG. 3 is a graph of the autocorrelation response function produced in FIG. 2.

As shown in FIG. 3, the result is an impulse function at lag equal 2, plus a dc term of 4. The autocorrelation technique therefore provides an accurate representation of the point source at lag=2, but offset by a constant dc term.

Figure 4:
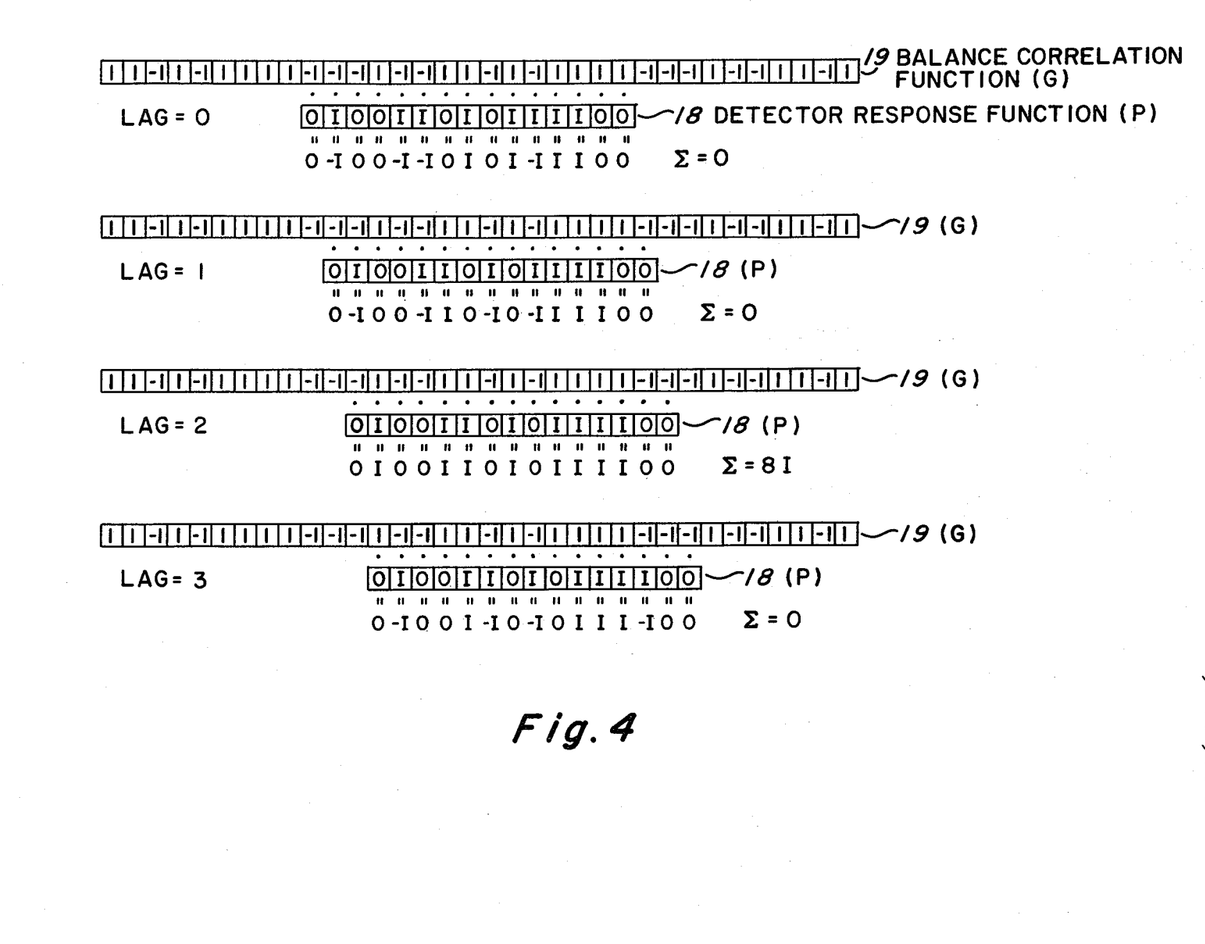
FIG. 4 is a schematic illustration of the manner in which the balanced correlation response function is generated for the device of FIG. 1.

FIG. 4 illustrates the manner in which balance correlation is used to eliminate the dc term that appears in the response function illustrated in FIG. 3. As shown in FIG. 4, the detector response function (P) is correlated with the balance correlation function (G). The balance correlation function (G) differs from the aperture function in that all 0 positions of the aperture function are represented by a −1 in the balance correlation function.

Figure 5:
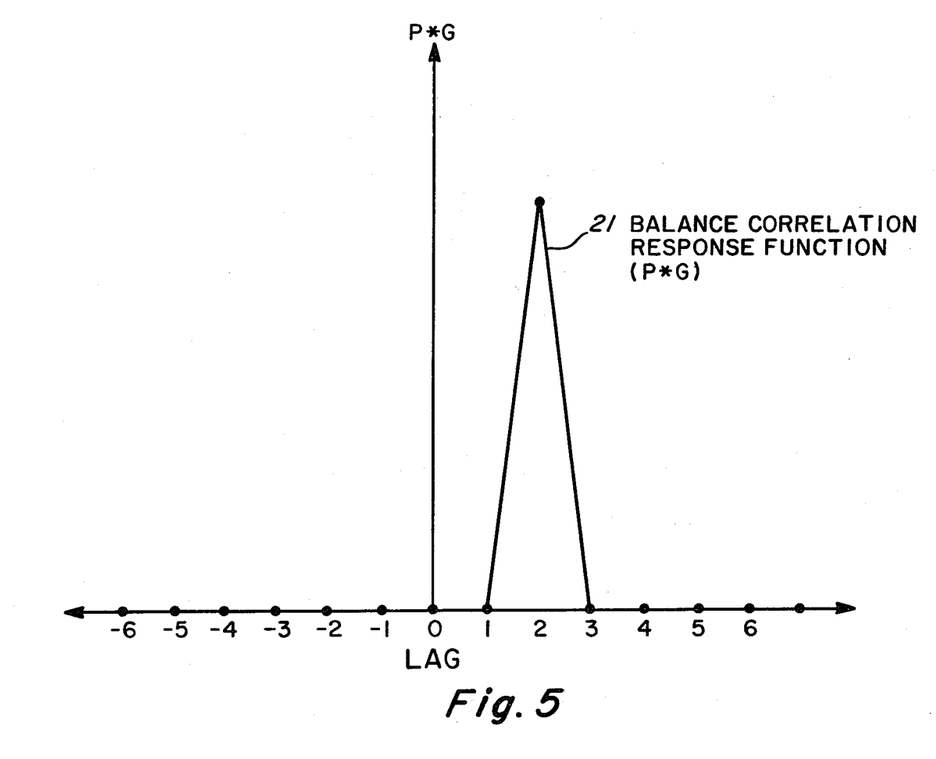
FIG. 5 is a graph of the balanced correlation response function produced in FIG. 4.

As shown in FIG. 5, the balanced correlation response function is an impulse at lag=2 with no offsetting dc term. Consequently, as schematically illustrated in FIGS. 1, 4, and 5, coded aperture imaging with a uniformly redundant array using balance correlation provides an accurate representation of the source with zero side lobes and no artifacts.

Figure 6:
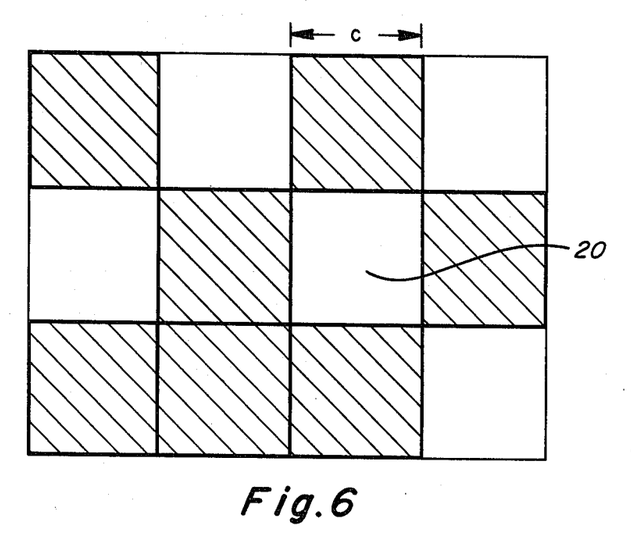
FIG. 6 is a schematic illustration of a portion of a two-dimensional uniformly redundant array pattern.

FIG. 6 is a schematic two-dimensional representation of a portion of a URA pattern wherein the shaded squares represent hole locations. As is apparent from FIG. 6, nonhole locations such as location 20 are non-self-supporting and require a substrate for support. However, as pointed out above, many applications of the uniformly redundant array aperture are not well-suited for the use of substrates.

Figure 7:
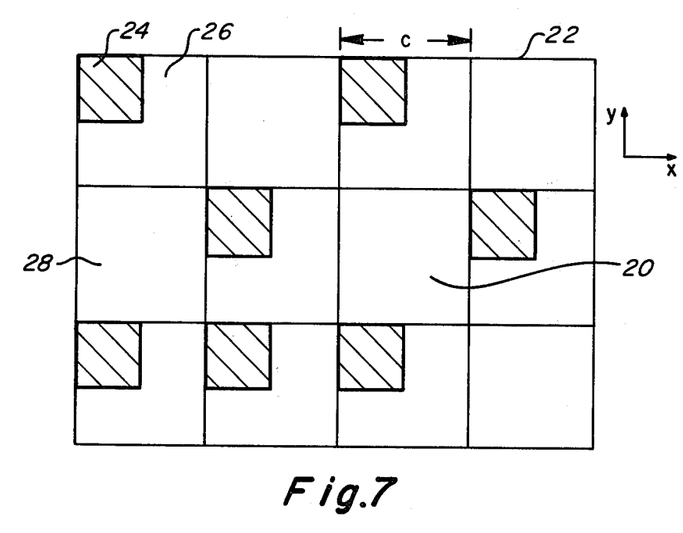
FIG. 7 is a schematic illustration of a self-supporting portion of a uniformly redundant array pattern corresponding to FIG. 6.

FIG. 7 discloses a self-supporting uniformly redundant array pattern which corresponds to the portion of the uniformly redundant array pattern illustrated in FIG. 6. In accordance with the present invention, the holes are placed in corresponding positions of the lattice pattern 22 and are made an integer function smaller than the lattice pattern 22 in each direction, i.e., both the X and Y directions. The self-supporting uniformly redundant array aperture can be more specifically described as having holes of size c/n placed at (u, v) such that $u = c \cdot i$, $v = c \cdot j$, where $A(\mathrm{mod}_r i, \mathrm{mod}_s j) = 1$, $0 \leq i \leq 2r$, and $0 \leq j \leq 2s$, n is an integer, and c is the spacing between possible hole locations. Both of the criteria set forth above, i.e., holes smaller by an integer fraction, and holes located at corresponding positions, must be complied with to maintain an artifact-free correlation response function. In addition, balanced correlation must be used.

Figure 8:
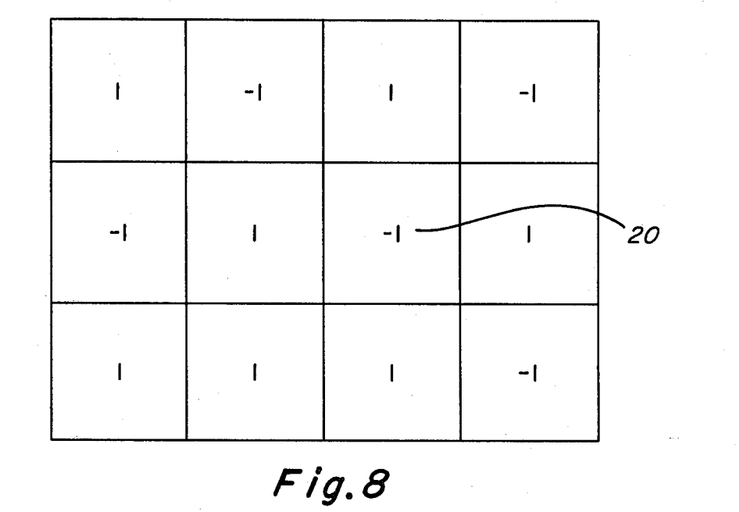
FIG. 8 is a schematic illustration of the balance correlation function G for the portion of the two-dimensional uniformly redundant array of FIG. 6.

FIG. 8 schematically discloses the balance correlation function (G) which would be utilized for the portion of the uniformly redundant array pattern disclosed in FIG. 6. As shown in FIG. 8, nonhole locations, such as nonhole location 20, are represented by −1's in the balance correlation function in the same manner as disclosed in FIG. 4.

Figure 9:
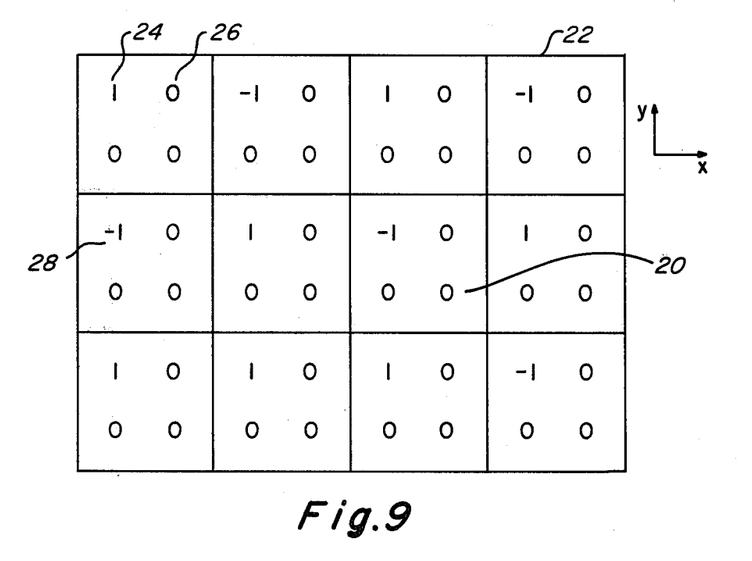
FIG. 9 is a schematic illustration of the balance correlation function G for the portion of the self-supporting uniformly redundant array pattern illustrated in FIG. 7.

FIG. 9 discloses the unique balance correlation function corresponding to the aperture pattern of FIG. 7, in accordance with the present invention. As illustrated in FIG. 9, hole locations, such as hole location 24, are represented by 1 while nonhole locations such as nonhole 28, are represented by −1. The remaining supporting area is represented by 0.

Figure 10:
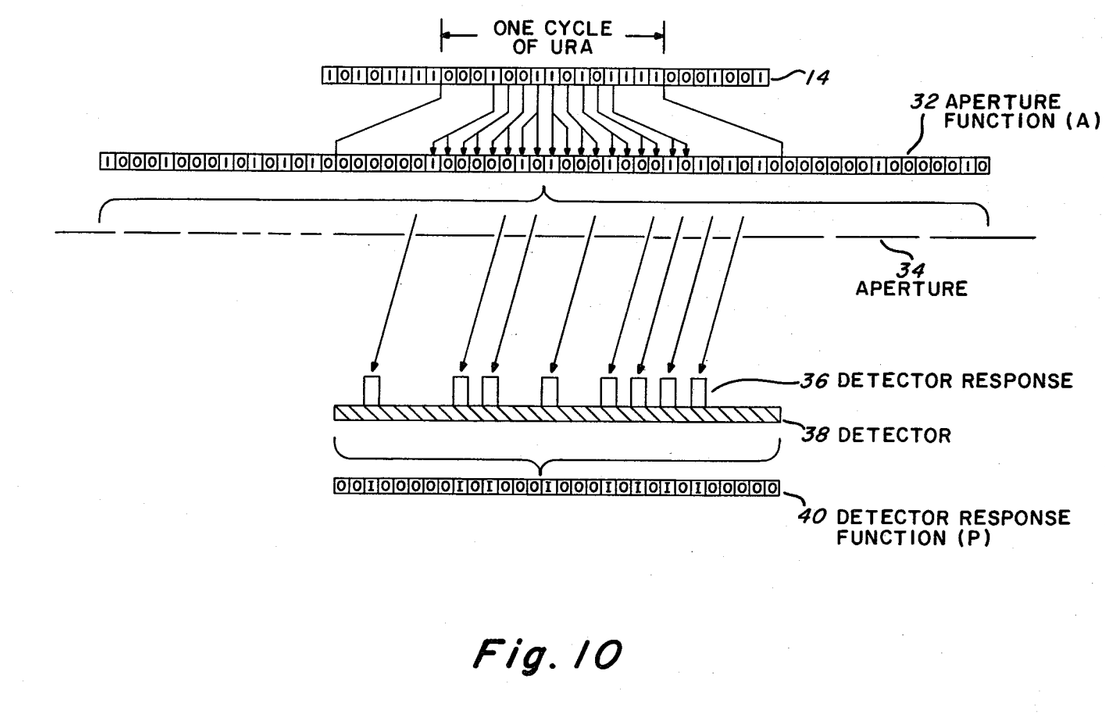
FIG. 10 is a schematic illustration of a one-dimensional coded aperture imaging system using a self-supporting uniformly redundant array pattern.

FIG. 10 is a schematic illustration of coded aperture imaging in one dimension using a self-supporting uniformly redundant array pattern. As illustrated in FIG. 10, a uniformly redundant array pattern 14 corresponding to the uniformly redundant array of FIG. 1 is divided into two parts (corresponding to n=2) to form a uniformly redundant array pattern 32 which would be self-supporting in two dimensions. The self-supporting uniformly redundant array pattern 32 is formed such that hole positions are represented by 1 in the left hand portion and 0 in the right hand portion, while 0 positions are represented by 0's in both portions. An aperture 34 is then formed by placing holes in the hole locations for the uniformly redundant array pattern 32. The detector response 36 is imaged on detector 38. From the detector response 36 a detector response function (P) 40 is generated.

Figure 11:
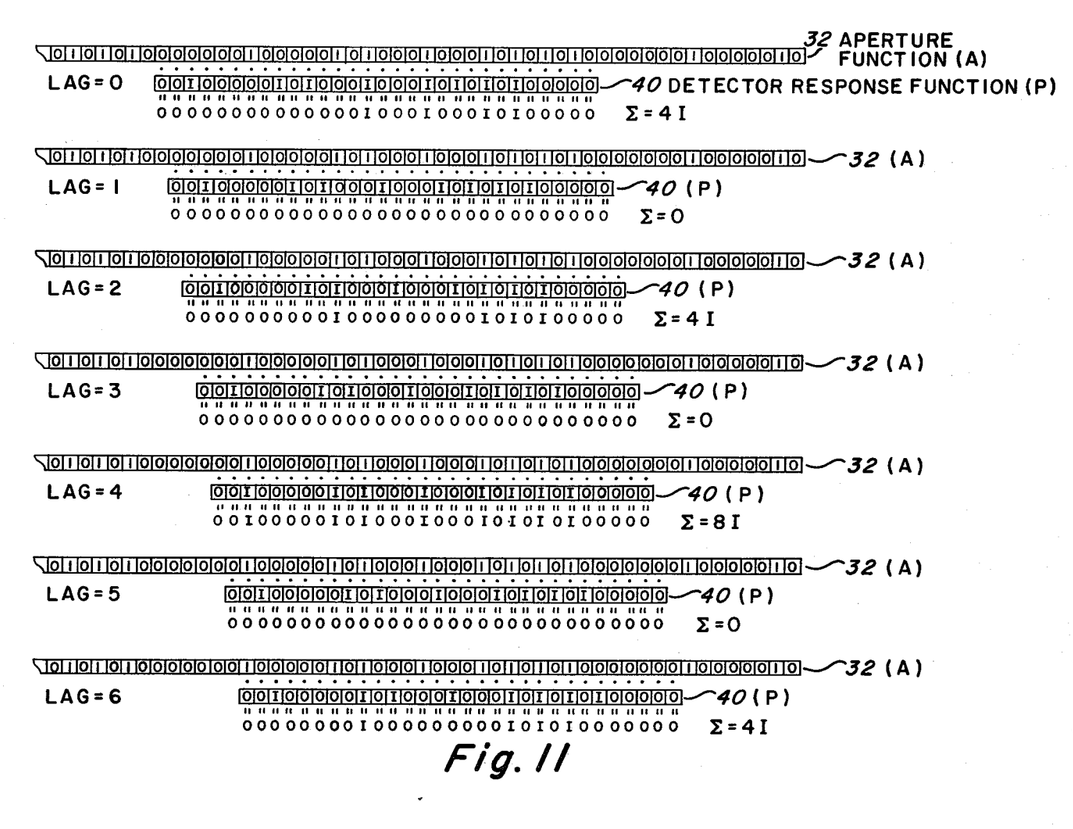
FIG. 11 is a schematic illustration of the manner in which the autocorrelation response function is generated for the uniformly redundant array pattern illustrated in FIG. 10.
Figure 12:
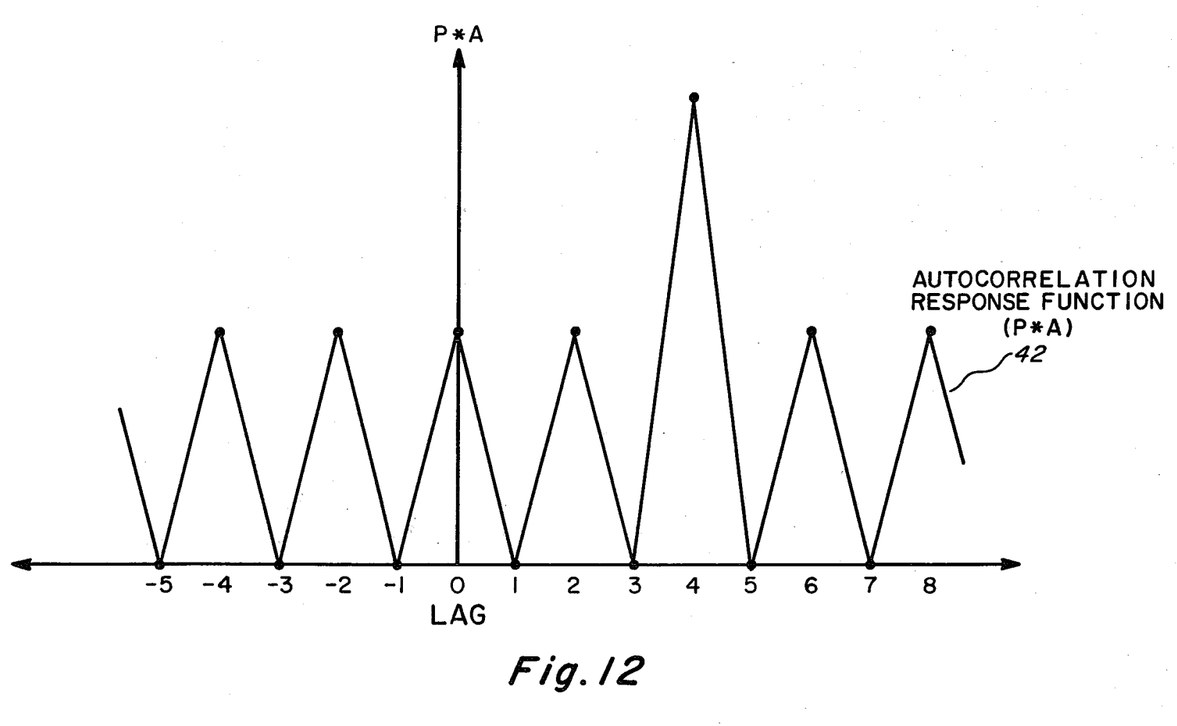
FIG. 12 is a graph of the autocorrelation response function produced in FIG. 11.

FIG. 11 discloses autocorrelation of the aperture function (A) 32 and detector response function (P) 40 for various lag positions. Autocorrelation is performed in the same manner as illustrated in FIG. 2. The autocorrelation response function (P*A) 42 is illustrated in FIG. 12. As shown, a sawtooth pattern is produced with a higher peak at the lag 4 position representing the source of nonfocusable radiation. As is evident from FIG. 12, the autocorrelation response function (P*A) 42 provides a poor response of the reconstructed source.

Figure 13:
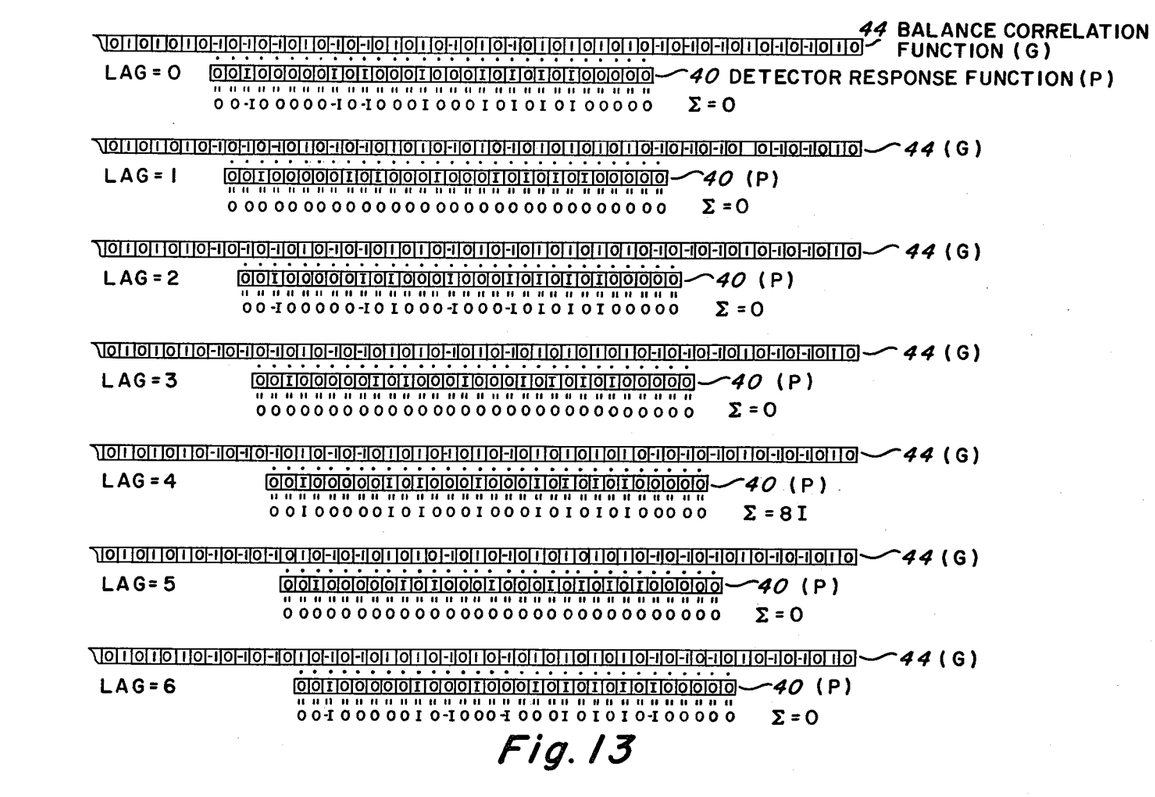
FIG. 13 is a schematic illustration of the manner in which the balanced correlation response function is generated for the device illustrated in FIG. 10, in accordance with the present invention.

FIG. 13 discloses correlation of the detector response function (P) 40 with a balanced correlation function (G) 44 generated in the manner disclosed in FIG. 9.

Figure 14:
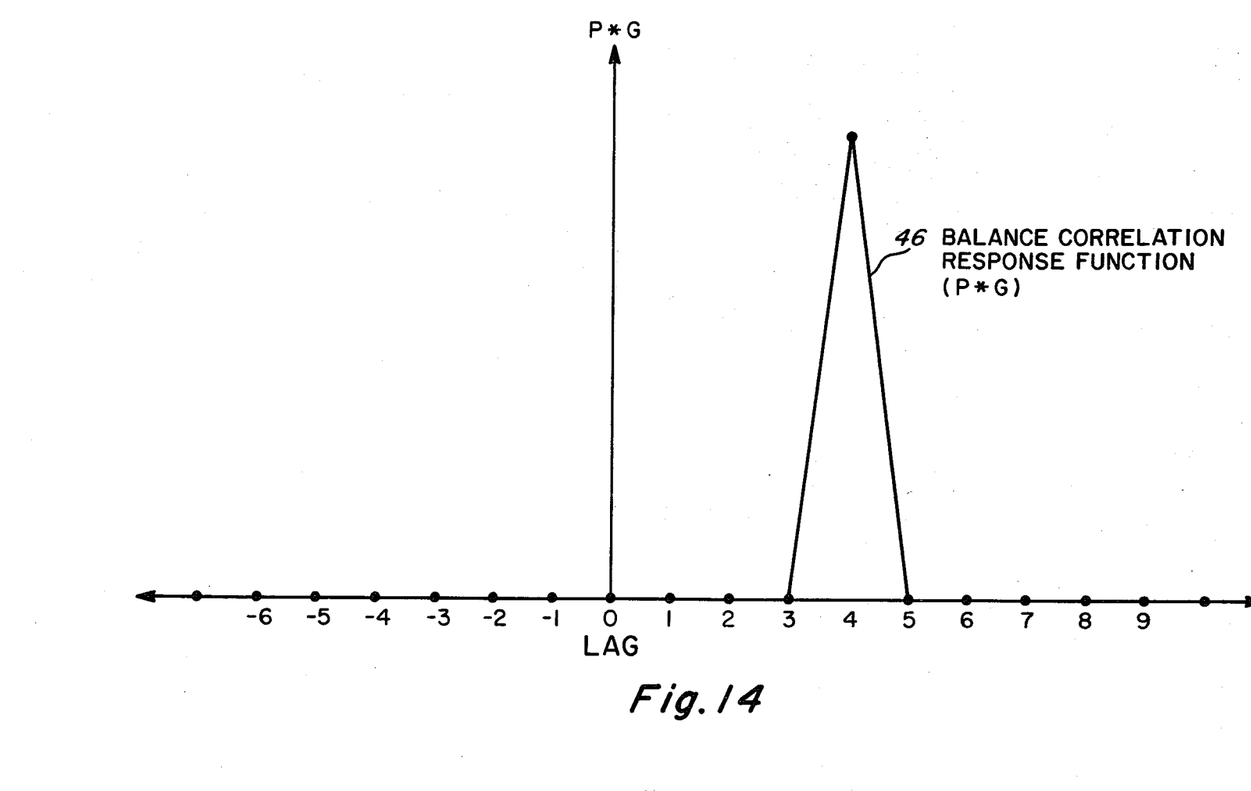
FIG. 14 is a graph of the balanced correlation response function generated in FIG. 13, in accordance with the present invention.

FIG. 14 discloses the balanced correlation response function (P*G) 46. As shown in FIG. 14, the balanced correlation response function (P*G) for the self-supporting uniformly redundant array is an impulse at lag=4 with 0 side lobes. As is clear from FIG. 14, the balance correlation response function (P*G) for a self-supporting array is an ideal response for the reconstructed image of the point source.

The balance correlation function illustrated in FIG. 9 can be more specifically described as a function G(I,J) wherein:

$G(I,J) = 1$ if $\mathrm{mod}_n(I) = 0$
  and $\mathrm{mod}_n(J) = 0$
  and $A[\mathrm{mod}_r(I/n), \mathrm{mod}_s(J/n)] = 1$ $G(I,J) = -1$ if $\mathrm{mod}_n(I) = 0$
  and $\mathrm{mod}_n(J) = 0$
  and $A[\mathrm{mod}_r(I/n), \mathrm{mod}_s(J/n)] = 0$ $G(I,J) = 0$ if $\mathrm{mod}_n(I) \neq 0$
  or $\mathrm{mod}_n(J) \neq 0$ $0 \leq I \leq 2\,nr;\ 0 \leq J \leq 2\,ns$ where the basic array has dimensions r by s, r and s are prime numbers and $r - s = 2$.

The present invention therefore provides a coded aperture imaging system which utilizes a uniformly redundant array pattern which is self-supporting. The self-supporting pattern eliminates the need for substrates and consequently renders the self-supporting uniformly redundant array pattern easier to fabricate. Additionally, the self-supporting uniformly redundant array pattern can be utilized for low energy applications where substrates would restrict throughput.

The foregoing description of a preferred embodiment of the invention has been presented for purposes of illustration and description. It is not intended to be exhaustive or to limit the invention to the precise form disclosed, and obviously many modifications and variations are possible in light of the above teachings. For example, the terms 1, −1, and 0 have been used throughout the specification to represent parameters of signals. It should be noted that the terms 1, −1, and 0 can represent any desired parameters of the signals such as polarity, magnitude, sign, etc. In addition, FIGS. 7, 9, 13 and 14 disclose an embodiment wherein n=2. Any integer value for n will produce a self-supporting pattern which can be reconstructed without artifacts. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A self-supporting uniformly redundant array aperture imaging device for imaging a source of nonfocusable radiation comprising:

a self-supporting uniformly redundant array aperture having holes which are of a size equal to c/n where c is the spacing between possible hole locations and n is an integer, said holes of said self-supporting uniformly redundant array formed at corresponding positions within hole locations of said uniformly redundant array;

means for detecting said nonfocusable radiation imaged by said uniformly redundant array;

means for balance correlating information from said means for detecting to generate a decoded image of said source of said nonfocusable radiation, said means for balance correlating information from said means for detecting comprising a balance correlation function wherein holes are represented by 1, nonholes are represented by −1, and supporting area is represented by 0.

2. A self-supporting uniformly redundant array aperture imaging device for imaging low energy nonfocusable radiation comprising:
  a self-supporting uniformly redundant array aperture aligned to aperture image said nonfocusable radiation, said self-supporting uniformly redundant array comprising an aperture having holes of size c/n placed at (u, v) such that $u=c\cdot i$, $v=c\cdot j$, where the basic array has dimensions r by s, r and s are prime numbers, $r-s=2$, $A(\text{mod}_r i, \text{mod}_s j)=1$, $0 \leq i \leq 2r$, $0 \leq j \leq 2s$, n is an integer and c is the spacing between possible hole locations;
  means for detecting said nonfocusable radiation imaged by said uniformly redundant array; and,
  means for balance correlating information from said means for detecting to generate a decoded image of said source of said nonfocusable radiation, said means for balance correlating information from said means for detecting comprising a function G(I,J) wherein:

$G(I,J) = 1$ if $\text{mod}_n(I) = 0$
  and $\text{mod}_n(J) = 0$
  and $A[\text{mod}_r(I/n), \text{mod}_s(J/n)] = 1$ $G(I,J) = -1$ if $\text{mod}_n(I) = 0$
  and $\text{mod}_n(J) = 0$
  and $A[\text{mod}_r(I/n), \text{mod}_s(J/n)] = 0$ $G(I,J) = 0$ if $\text{mod}_n(I) \neq 0$
  or $\text{mod}_n(J) \neq 0$ $0 \leq I \leq 2\ nr$; $0 \leq J \leq 2\ ns$.

* * * * *